Sept. 7, 1926.
F. G. BRISTOW
1,598,598
SHEEP SHEAR COMB
Filed Oct. 30, 1925
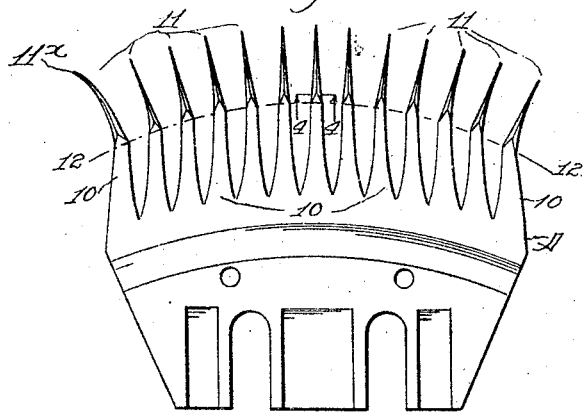
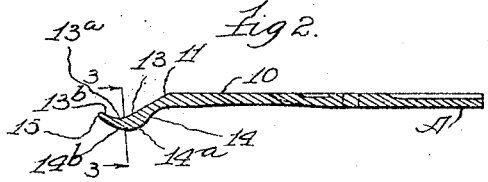
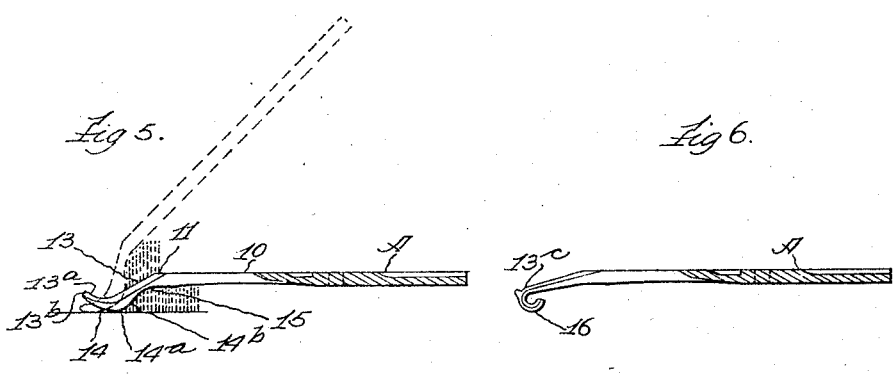
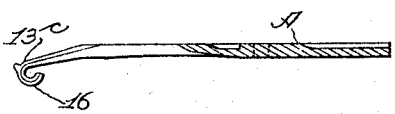
Inventor
Franciss G. Bristow.
by his Attorneys.

Patented Sept. 7, 1926.

1,598,598

UNITED STATES PATENT OFFICE.

FRANCISS G. BRISTOW, OF SYDNEY, AUSTRALIA.

SHEEP-SHEAR COMB.

Application filed October 30, 1925. Serial No. 65,782.

The purpose of this invention is to provide an improved construction of comb for sheep shear. It consists of the elements and features of construction shown and described as indicated in the claims.

In the drawings:

Figure 1 is a top plan view of a sheep shear comb embodying this invention.

Figure 2 is a section at the line 2—2 on Figure 1.

Figure 3 is a detail section at the line 3—3 on Figure 2.

Figure 4 is a detail section at the line 4—4 on Figure 2.

Figure 5 is a diagrammatic view comprising an edge elevation of the comb, showing the operation of the comb for varying the length of stubble.

Figure 6 is a view similar to Figure 2 showing a modification with respect to the form of the tooth extension.

A principal specific purpose of this invention is, first, to provide a sheep shear comb by means of which the shearer may readily graduate the length of the stubble within desirable limits by slightly varying the angle of tilt of the shear in operation, without incurring liability of pricking or scratching the animal by reason of the point pressing the skin at an angle too abrupt, or the liability of failure to part the wool fibre down to the skin, and thereby leave the stubble matted and uneven.

This purpose is accomplished by giving to the teeth, 10, of the comb A, the form shown, wherein the teeth are each characterized by comprising an extension, 11, forward of the line of cut—the arc of sweep of the vibrating cutter—indicated by the curved line 12—12 on Figure 1, said extension trending slopingly down forward at approximately a 45° angle, though considerable variation each way of this angle is permissible, this slope continuing as to the upper edge, 13, of the tooth until that edge reaches a point, 13ª, about as low as the plane on the back side of the comb, and in the most preferred form shown in Figures 1 and 2 slightly lower than that plane, the finger extending thence a short distance further with its upper edge, 13ᵇ,—in the preferred form—curved upwardly and concave rearward and upward, as seen in Figure 2. The lower edge, 14, of the finger is circumflex in contour, concave downward and rearward to such a point as 14ª, and then convex downward as at 14ᵇ, the last mentioned curve converging with the upper edge, 13, the two edges meeting in a slightly blunted point, 15, which is positioned substantially in the plane of the back or under side of the comb plate.

The finger extensions, in their horizontal dimension, are quite thin, and they are tapered in thickness nearly to knife-edge at the upper edge, as nearly as possible from the beginning of their protrusion forward of the line of cut; and their forward terminal portion is tapered in thickness nearly to knife-edge at both upper and lower edges, as seen in section in Figure 3.

The comb tooth extensions, except the outermost at the left hand, are all of the same length; and they are deflected laterally in opposite directions from the three middle teeth, fan-wise—that is, radiating from a common center which may desirably be located in the axis of the vibrating cutter—the center of the arc, 12—12, of the line of cut. These extensions thus terminate all in an arc concentric with the arc of the line of cut.

It will be understood that in operation of the shear the pressure applied to hold the comb to the pelt causes all the teeth, including the extreme teeth at both sides, to come in touch with the pelt even when the comb is tilted up at the greatest angle at which it is operated for producing the longest stubble; and that, therefore, at any tilt of the comb the point of cut as to all the teeth is at the same elevation, and the stubble is therefore caused to be uniform in length over the full breadth of the comb.

The "fanning" of the teeth, as described, has the purpose and gives the result of gathering the wool between the comb finger extensions somewhat more compactly, and therefore in better condition for being severed without being leaned laterally by the stroke of the cutter before actual severance occurs; by diverging all the extensions from a common center the amount of wool gathered is the same in all the tooth gaps, the slight exception in the case of the gaps between the middle tooth and the next one at each side being negligible.

The outermost tooth at the left hand side has its extension, 11ˣ, curved outwardly and extended slightly beyond the arc in which all the other tooth extensions terminate. This tooth, it will be understood, travels over the stubble or previously sheared area of the pelt; and this outwardly-curved extension is provided to insure entering under any wool filaments which may be leaning outwardly from the boundary line of the last preceding shearing stroke so as to gather such leaning filaments into the first tooth gap.

The form of the tooth extensions shown in Figure 2 is the preferred form; but considerable variation of this form is permissible without departing from the spirit, or sacrificing the value of the invention. In this form the extension is widened vertically as a result of the circumflex contour of the lower edge, having its downwardly convex portion, 14ᵇ, formed in an arc of relatively short radius, so that the forward upwardly finishing portion of this curve converges toward the upper edge, 13ᵇ, as seen in Figure 2.

In the form shown in Figure 6 the upper edge of the tooth extension at the terminal portion thereof is deflected slightly upwardly with respect to the initial slope which extends to the point, 13ᶜ, and the terminal portion of the extension is bent bodily down, rearward, and up behind the initial slope of the extension, forming by its edge—which being continuous with the upper edge, becomes the lower edge by this downwardly rearward deflection—a curvilinear "rider," 16, corresponding in function and service to the downwardly convex terminal portion of the terminal of the other forms.

While each of the forms shown has for certain situations and conditions some advantage, and they are both within the scope of the invention, for general use and for meeting the widest range of conditions I consider the form shown specifically in Figures 2 and 5 as the preferred embodiment of my invention.

I claim:

1. A sheep shear comb having the teeth each extending forward of the line of cut, and sloped downward in their initial forward extent, the upper edge being slightly deflected upwardly relative to the previous downward slope at a short distance back from the terminal, and the lower edge being downwardly convex back of the terminal for a substantial portion of the length of the extension.

2. A sheep shear comb having the teeth extending forwardly of the line of cut with downward trend and terminating all in a forwardly convex arc, the extensions being laterally deflected approximately at the line of cut, fan-wise in opposite directions from the middle of the width of the comb.

3. A sheep shear comb having the comb teeth extended forward of the line of cut and sloped downward and forward as to the upper edge to a point substantially as low as the plane at the under side of the comb plate, and as to the lower edge formed for converging with the upper edge to a blunt point, the terminal portion of the tooth extension being deflected bodily upward to the extent that the upper edge is upwardly and rearwardly concave for a relatively short distance back of the blunt point.

4. In the construction defined in claim 3 foregoing, the arc of termination of the tooth extensions being substantially concentric with the arc of the line of cut, and the fan-wise divergence of said extension being such as to cause them all to extend radially with respect to the center of said arc whereby the tilting of the comb, when pressed to the skin of the animal, causes equal elevation of the points of cut of all the teeth.

In testimony whereof, I have hereunto set my hand this 5th day of September, 1925.

FRANCISS G. BRISTOW.